(12) United States Patent
Toriumi

(10) Patent No.: US 6,759,357 B1
(45) Date of Patent: Jul. 6, 2004

(54) SPUNBONDED NON-WOVEN FABRIC AND LAMINATE

(75) Inventor: Michio Toriumi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/936,899

(22) PCT Filed: Jan. 19, 2000

(86) PCT No.: PCT/JP00/00219

§ 371 (c)(1),
(2), (4) Date: Sep. 19, 2001

(87) PCT Pub. No.: WO01/53585

PCT Pub. Date: Jul. 26, 2001

(51) Int. Cl.$^7$ .............................. B32B 5/16; C08K 3/26; C08K 5/02
(52) U.S. Cl. ...................... 442/375; 442/381; 442/382; 442/400; 442/401; 442/417; 524/423; 524/425; 524/451; 524/462; 524/582; 524/588
(58) Field of Search ................................. 524/423, 425, 524/451, 462, 582, 588; 442/345, 401, 417, 400, 381, 382

(56) References Cited

U.S. PATENT DOCUMENTS 5,736,465 A * 4/1998 Stahl et al. .................... 442/59

FOREIGN PATENT DOCUMENTS

| JP | 6-280129 A | | 10/1994 |
|---|---|---|---|
| JP | 9-41252 A | | 2/1997 |
| JP | 10-292227 A | | 11/1998 |
| JP | 11-12400 A | | 1/1999 |
| JP | 11-012400 | * | 1/1999 |
| WO | WO 95/30708 | | 11/1995 |
| WO | WO 95/32091 | | 11/1995 |

OTHER PUBLICATIONS

International Search Report issued in International Application No. PCT/JP00/00219, Feb. 22, 2000.

* cited by examiner

Primary Examiner—Elizabeth M. Cole
Assistant Examiner—John J. Guarriello
(74) Attorney, Agent, or Firm—Burns, Doane, Swecker & Mathis, LLP

(57) ABSTRACT

A spunbonded non-woven fabric and a laminate composed of one or more such spunbonded non-woven fabrics and of one or more melt-blown non-woven fabrics under lamination, wherein the spunbonded non-woven fabric does scarcely suffer from occurence of rough surface and reveal scarce adherent touch with better hand feel due to permission of attaining more finer filament and can be produced efficiently without suffering from filament fracture on the spinning, wherein the said spunbonded non-woven fabric is made of fibers of a polypropylene resin composition having fiber finenesses of 0.8 to 2.8 denier and has an average friction factor (MIU) of 0.1 to 0.3, a thickness uniformity of 0.8 or less, a waterproof performance of at least 60 mmH$_2$O and a gas permeability of not higher than 480 ml/cm$^2$/sec.

21 Claims, No Drawings

SPUNBONDED NON-WOVEN FABRIC AND LAMINATE

FIELD OF THE INVENTION

The present invention relates to a spunbonded non-woven fabric and to a laminate thereof comprising one or more webs of such spunbonded non-woven fabric, wherein the spunbonded non-woven fabric is made of fibers obtained by spinning a polypropylene resin composition comprising a polypropylene resin and a lubricant, which lubricant comprises a vinylidene fluoride/hexafluoropropylene copolymer and one or more inorganic compounds.

BACKGROUND OF THE INVENTION

While there have been used as the polypropylene resin for the raw material for non-woven fabric those which are produced using a Ziegler catalyst or a solid titanium catalyst, the polypropylene resins produced using such a catalyst, which have wider molecular weight distribution, are apt to suffer from fluctuation in the flow rate of the molten resin upon extrusion from a spinning nozzle into filament and are inferior in the spinning performance. They have also a narrow permissible range of temperature for spinning.

On the other hand, polypropylene resins having narrower molecular weight distribution produced using a single-site catalyst, such as metallocene catalyst or so on, are subject to occurrence of surface roughness and are difficult to process into a formed product exhibiting better appearance, though they are superior in the spinning performance together with permission of attaining finer filament, as compared with the polypropylene resins having wider molecular weight distribution obtained using Ziegler catalyst. For example, when an extrusion spinning is carried out to spin into a filament using a polypropylene resin which has higher melt flow rate and which is generally recognized to have a better moldability, the resulting spun filament may often suffer from occurrence of rough surface of the filament due to occurrence of melt-fracture, causing thus an inferior appearance. When extrusion-molded into film or sheet, inferior appearances, such as rough surfaces, irregular thickness and white clouding, may often be brought about.

It has heretofore been known, that extrusion-molded articles exhibiting better appearances are produced by incorporating a lubricant in a polypropylene resin to improve its moldability. There has, however, not been known, that the appearance of a polypropylene resin produced by polymerization using a single-site catalyst is considerably improved by incorporating therein a lubricant component comprising a vinylidene fluoride/hexafluoropropylene copolymer and one or more inorganic compounds.

Also, it has not been known, that non-woven fabric made of more finer long filaments can be produced efficiently by incorporating therein a lubricant comprising a vinylidene fluoride/hexafluoropropylene and an inorganic compound and that fibers exhibiting scarce adherent finger touch are obtained thereby.

The object of the present invention is to provide a spunbonded non-woven fabric and a laminated product thereof, wherein the fabric is made of fibers produced from a polypropylene resin composition used as the raw material and exhibits better appearance with scarce occurrence of surface roughness together with scarce adherent finger touch and with superior hand feel due to permission of realizing more finer filament thickness and wherein the fibers can be produced efficiently without suffering from breaking of spun filaments.

DISCLOSURE OF THE INVENTION

The present invention consists in the following spunbonded non-woven fabric and laminate thereof:

(1) A spunbonded non-woven fabric made of fibers which comprise a polypropylene resin and have fiber finenesses in the range from 0.8 to 2.8 denier, wherein the said fabric has an average friction factor (MIU) of 0.1 to 0.3, a thickness uniformity of not higher than 0.8, a waterproof performance of at least 60 mm $H_2O$ and a gas permeability of not higher than 480 ml/$cm^2$/sec.

(2) A spunbonded non-woven fabric made of fibers obtained by spinning a polypropylene resin composition comprising 99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and 0.005–0.3% by weight of a lubricant comprising 70 to 100% by weight of a vinylidene fluoride/hexafluoropropylene copolymer and 0 to 30% by weight of one or more inorganic compounds.

(3) A spunbonded non-woven fabric as defined in the above (1) or (2), wherein the polypropylene resin is that produced by a polymerization process using a single-site catalsyt.

(4) A spunbonded non-woven fabric made of fibers obtained by spinning a polypropylene resin composition comprising 99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and 0.005–0.3% by weight of a lubricant comprising 70 to 100% by weight of a vinylidene fluoride/hexafluoropropylene copolymer and 0 to 30% by weight of one or more inorganic compounds, the said inorganic compounds being selected from the group consisting of talc, calcium carbonate, silicon oxide and barium sulfate.

(5) A spunbonded non-woven fabric made of fibers obtained by spinning a polypropylene resin composition comprising 99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and 0.005–0.3% by weight of a lubricant comprising 70 to 100% by weight of a vinylidene fluoride/hexafluoropropylene copolymer and 0 to 20% by weight of talc, 0 to 10% by weight of calcium carbonate and 0 to 10% by weight of silicon oxide.

(6) A spunbonded non-woven fabric made of fibers obtained by spinning a polypropylene resin composition comprising 99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and 0.005–0.3% by weight of a lubricant comprising 89 to 91% by weight of a vinylidene fluoride/hexafluoropropylene copolymer, 5 to 7% by weight of talc, 1.5 to 2.5% by weight of calcium carbonate and 1.5 to 2.5% by weight of silicon oxide.

(7) A non-woven fabric laminate comprising one or more webs of a spunbonded non-woven fabric as claimed in any one of claims 1 to 6 and one or more webs of one or more melt-blown non-woven fabrics.

(8) The non-woven fabric laminate as defined in the above (7), wherein it has a three-layered structure of spunbonded non-woven fabric/melt-blown non-woven fabric/spunbonded non-woven fabric.

THE BEST MODE FOR EMBODYING THE INVENTION

The spunbonded non-woven fabric according to the present invention is one which is made of fibers having a content of polypropylene resin as a main component and fiber finenesses in the range from 0.8 to 2.8 denier, preferably from 0.8 to 2.5 denier, wherein the said fabric has an average friction factor (MIU) in the range from 0.1 to 0.3, preferably from 0.1 to 0.29, a thickness uniformity not higher than 0.8, preferably not higher than 0.75, a waterproof performance of at least 60 mm $H_2O$, preferably at least 63 mm $H_2O$, and a gas permeability of not higher than 480 ml/cm$^2$/sec, preferably not higher than 460 ml/cm$^2$/sec.

The spunbonded non-woven fabric according to the present invention, which has the material properties given above, may preferably be made of a raw material consisting of a polypropylene resin composition as will be detailed in the following, though it may not be restricted to such polypropylene resin composition so long as the material properties are in the range defined above.

The fiber fineness value mentioned above is that determined by three-point measurements on each filament by magnified observation under an optical microscope.

The average friction factor (MIU) is expressed by a value determined by the KATO TECH-method using KES-SE Frictional Feel Tester or KES-FB4 Surface Tester of the firm KATO TECH and is based on a dimensionless unit. The average friction factor is called usually MIU and sometimes referred to as surface frictional resistance value. The lower the average friction factor (MIU) is, the lesser the adherent touch will be.

The value for the thickness uniformity is determined in such a way that the specific areal weight [A (g/m$^2$)] of a 0.15 m$^2$ test piece is first determined and, then, five thicker portions and twenty thinner portions are chosen visually on the test piece and are punched out using a punching tool of 13 mmφ, whereupon the specific areal weights for these punched out segments are determined [B (g/m$^2$) for the thicker portions and C (g/m$^2$) for the thinner portions], from which the thickness uniformity is calculated by the equation:

Thickness uniformity=$(B-C)/A$

The waterproof performance is determined according to JIS L 1092.

The gas-permeability is determined according to JIS L 1096.

The spunbonded non-woven fabric according to the present invention is that produced from a polypropylene resin composition used as the raw material which comprises, as will be detailed in the following, a polypropylene resin and a lubricant.

The spunbonded non-woven fabric according to the present invention is obtained from such a polypropylene resin composition as above used as the raw material, wherein special preference is given to those which have fiber finenesses, average friction factors (MIU), thickness uniformities, waterproof performances and gas-permeabilities each in the range given above.

The polypropylene resin to be incorporated according to the present invention has a molecular weight distribution, expressed by polystyrene-converted Mw/Mn (weight average molecular weight/number average molecular weight) determined by a gel permeation chromatography (GPC) using o-dichlorobenzene as the elution solvent and using monodisperse polystyrenes as the standard substances, in the range from 1 to 3.5, preferably from 1 to 3. Due to the molecular weight distribution lying in the above range, the spinning stability is superior and the filament fracture is excluded, whereby the spinning performance is superior not only for polypropylene resins produced using a single-site catalyst but also for polypropylene resins produced using a solid titanium catalyst or so on.

The molecular weight distribution (Mw/Mn) can be determined in the manner given below using, for example, GPC-150C of Water Co. Thus, a separation column of TSK GNH TH (of Tosoh K.K. having a column diameter of 7.8 mm and a length of 600 mm) is used. The GPC is effected at a column temperature of 140° C. using o-dichlorobenzene for the mobile phase with 0.025% by weight of BHT as an antioxidant, while moving the mobile phase at a rate of 1.0 ml/min. The sample concentration is settled at 0.1% by weight and the injected amount of the sample is settled at 500 μl. As the detector, a differential refractometer may be used. As the standard polystyrenes, those supplied from Tosoh K.K. may be employed.

The polypropylene resin having a narrow molecular weight distribution as mentioned above can be produced easily by a polymerization process using a single-site catalyst, though not restricted thereto.

A single-site catalyst is one in which the active sites are uniform (single-site) and for which, for example, metallocene catalysts (so-called Kaminsky catalysts) and Brookheart catalysts may be recited. According to the present invention, polypropylenes produced by a known polymerization technique using a metallocene catalyst or a Brookheart catalyst can be employed.

For instance, the metallocene catalyst may be a catalyst composed of a transition metal compound based on metallocene and of at least one compound selected from the group consisting of organoaluminum compounds and compounds capable of building up an ion pair by reacting with the said transition metal compound based on metallocene. Such a metallocene catalyst may be present in a form supported on an inorganic substance.

For the above-mentioned transition metal compounds based on metallocene, there may be recited for example, those which are disclosed in Japanese Patent Kokais Hei 5-209014 A (corresponding to U.S. Pat. Nos. 5,296,434 and 5,514,760), Hei 6-100579 A (corresponding to U.S. Pat. Nos. 5,770,753, 5,786,432 and 5,840,644), Hei 1-301704 A (corresponding to U.S. Pat. No. 4,931,417), Hei 3-193796 A (corresponding to U.S. Pat. No. 5,036,034) and Hei 5-148284 A (corresponding to U.S. Pat. Nos. 5,329,031 and 5,349,032).

For the organoaluminum compounds, there may be recited, for example, alkylaluminums and linear and cyclic aluminoxanes.

Such a linear or cyclic aluminoxane is formed by bringing an alkylaluminum into contact with water. It can be obtained, for example, by incorporating an alkylaluminum in the polymerization and introducing water to the polymerization mixture afterwards or by causing the alkylaluminum to react with the water of crystallization of the complex salt or with adsorbed moisture on an organic or inorganic compound.

For the compound capable of building up ion pair by reacting with the transition metal compound based on metallocene, there may be recited, for example, Lewis acids, ionic compounds and carboranes disclosed in Japanese Patent Kohyo Hei. 1-501950 A (corresponding to WO 88/05792) and Japanese Patent Kokai Hei 3-207704 A (corresponding to U.S. Pat. Nos. 5,519,100 and 5,614,457).

As the inorganic substances on which the single-site catalyst is supported, there may be exemplified silica gel, zeolites and diatomaceous earth.

As the polypropylene resin, those having an isotactic structure from the stereospecificity due to the use of a single-site catalyst. It is permissible to use also polypropylene resins having syndiotactic structure.

The polypropylene resin to be employed according to the present invention may be produced using, not only a single-site catalyst, but also a solid titanium catalyst. As the solid titanium catalyst, one which is constituted of a highly stereospecific titanium catalyst component; an organoaluminum catalyst component and an electron donor component may be exemplified. When the molecular weight distribution value of the polypropylene resin produced using the solid titanium catalyst exceeds over the upper limit mentioned above, it is permissible to adjust the molecular weight distribution value within the defined range by rendering the molecular weight distribution narrower by, for example, addition of a degrading agent or by heat degradation.

For the polymerization technique using the catalyst mentioned above, bulk polymerization, solution polymerization, suspension polymerization, gas phase polymerization and so on may be recited. These polymerization techniques may be realized either in a batch-wise practice or in a continuous practice.

For the condition of the polymerization, a polymerization temperature in the range from minus 100 to plus 250° C., a polymerization duration in the range from 5 minutes to 10 hours and a polymerization pressure in the range from normal pressure to 29 MPa (from normal pressure to 300 kgf/cm$^2$, gauge) may be incorporated.

On producing the polypropylene resin, it is possible to realize a homo-polymerization using only propylene, while it is permissible to realize a copolymerization of propylene with other α-olefin(s), for the purpose of, for example, improving the impact resistance or flexibility and of decreasing the density. For such other α-olefins, there may be recited, for example, those having 2 to 20 carbon atoms, preferably 2 to 8 carbon atoms, such as ethylene, 1-butene, 3-methyl-1-pentene, 4-methyl-1-pentene, 1-hexene, 1-octene and 1-decene. The α-olefins to be co-polymerized with propylene may be incorporated solely or in a combination of two or more of them. The proportion of the α-olefin in the polymer may be not more than 10 mole %, preferably not more than 6 mole %.

The polypropylene resin to be incorporated according to the present invention has a melt flow rate (MFR) determined according to ASTM D 1238 at a temperature of 230° C. under a load of 2.16 kg (the same applies to that appearing afterwards) in the range from 0.01 to 300 g/10 min., preferably from 1 to 150 g/10 min. Due to the MFR values within the range given above, spinning can be realized at a superior sinning stability without suffering from filament break-down and filament surge.

The lubricant to be incorporated according to the present invention is one which comprises 70–100% by weight, preferably 80 to 95% by weight of a vinylidene fluoride/hexafluoropropylene copolymer and from 0 to 30% by weight, preferably from 5 to 20% by weight of one or more inorganic compounds.

For the inorganic compound to be incorporated as the lubricant component, there may be exemplified one or more selected from the group consisting of talc, calcium carbonate, silicon oxide and barium sulfate.

Concrete examples of the lubricant include those which contain 70–100% by weight, preferably 90–95% by weight, of a vinylidene fluoride/hexafluoropropylene copolymer, 0–20% by weight, preferably 1–10% by weight, of talc, 0–10% by weight, preferably 1–5% by weight, of calcium carbonate and 0–10% by weight, preferably 1–5% by weight, of silicon oxide. At the most favorably employed lubricants are those which contain 89–91% by weight of vinylidene fluoride/hexafluoropropylene copolymer, 5–7% by weight of talc, 1.5–2.5% by weight of calcium carbonate and 1.5–2.5% by weight of silicon oxide. When the above-mentioned most favorably employed lubricant is incorporated, the resulting fabric can exclude occurrence of rough surfaces at the most and has better appearance with simultaneous attainment of at the most scarce adherent finger touch and smallest fineness of the fibers.

For the lubricant, commercial products may also be used. As commercial lubricants, for example, DYNAMAR FX-9613 (trademark, a product of the firm 3M containing 90% by weight of a content of vinylidene fluoride/hexafluoropropylene copolymer, 6% by weight of a content of talc, 2% by weight of a content of calcium carbonate and 2% by weight of a content of silicon oxide) and others.

It is permissible to incorporate together, in addition to the above-mentioned lubricant, one or more other known lubricants, for example, lubricants based on hydrocarbon, such as liquid paraffin, natural paraffin, microwax, synthetic paraffin, polyethylene wax, chlorinated hydrocarbons and fluorocarbon oils; lubricants based on fatty acids, such as higher fatty acids and fatty oxyacids; lubricants based on fatty acid amides, such as fatty acid amides and alkylene-bis-fatty acid amides; lubricants based on esters, such as lower alcohol esters of fatty acids, polyhydric alcohol esters of fatty acids, fatty alcohol esters of fatty acids and polyglycol esters of fatty acids; lubricants based on alcohols, such as fatty alcohols, polyhydric alcohols, polyglycols and polyglycerols; and metal soaps.

The polypropylene resin composition to be used as the raw material for the spunbonded non-woven fabric according to the present invention is one which comprises the polypropylene resin mentioned above and one or more lubricants including that containing the vinylidene fluoride/hexafluoropropylene copolymer and one or more inorganic compounds.

In the polypropylene resin composition, the content of the polypropylene resin is in the range from 99.995 to 99.7% by weight, preferably from 99.9 to 99.98% by weight, and the content of the lubricant is in the range from 0.005 to 0.3% by weight, preferably from 0.02 to 0.1% by weight. When the content of the lubricant is in the above range, a spunbonded non-woven fabric which has a better appearance without occurrence of rough surfaces and with scarce adherent touch and which can attain more finer filament diameters can be produced in an efficient manner without causing break-down of filament.

The polypropylene resin composition according to the present invention to be used as the raw material for the spunbonded non-woven fabric may contain other ingredients, such as thermoplastic resin(s) other than said polypropylene resin, stabilizer to heat, stabilizer to weathering, antioxidant, antistatic agent, anti-blocking agent, dyestuffs, pigments, natural oils and synthetic oils, within the range not obstructing the purpose of the present invention.

The polypropylene resin composition to be used as the raw material for the said spunbonded non-woven fabric according to the present invention may be prepared by, for example, subjecting the polypropylene resin component, the lubricant component and other optionally incorporated components to melt-kneading on an extruding machine, kneader or so on. Alternatively, it is possible to prepare preliminarily a masterbatch by admixing the lubricant component to the polypropylene resin or to other polymer (for example, a polypropylene resin other than the above-mentioned polypropylene resin) so as to reach a higher content of the lubricant component and, then, the resulting masterbatch is melt-kneaded with the polypropylene resin component.

The polypropylene resin composition prepared in the manner as above will result in a spunbonded non-woven fabric exhibiting better appearance without suffering from occurrence of rough surfaces, even when a polypropylene resin produced by polymerization using a single-site catalyst. It exhibits scarce adherent finger touch. In addition, it does not suffer from filament fracture upon the spinning, so that it can be spun into longer filaments having finer filament diameters efficiently in a continuous manner without causing filament fracture even on drawing the longer filaments for preparing webs therefrom.

The spunbonded non-woven fabric according to the present invention is made of filaments, preferably of long-filaments, which are obtained by spinning the polypropylene resin composition, in which the spun filaments building up the fabric (web) prepared by piling up the spun filaments are partly bonded together. While the bonding of the spun filaments may preferably be effected by thermal press-bonding by means of an embossing work, it is also possible to effect the bonding by a needle punch or water-punch. The spunbonded non-woven fabric is not restricted only to a single web fabric but may be made of two or more webs. Each web of a spunbonded non-woven fabric of two or more webs may be made of different raw material.

The fibers constituting the spunbonded non-woven fabric may either be made from one single kind of the polypropylene resin composition or from two or more kinds of polypropylene resin compositions. When the fibers of the spunbonded non-woven fabric are made of two or more kinds of polypropylene resin compositions, the filament structure is not specifically restricted and may, for example, have a core/sheath structure in which a core filament of one polypropylene resin composition is covered completely or partly by a filament sheath made of another polypropylene resin composition or may have a structure in which a parallely extending two filaments are bonded together to form composite filament.

The filaments constituting the spunbonded non-woven fabric according to the present invention may or may not be crispated.

The spunbonded non-woven fabric according to the present invention may favorably have an average fiber fineness of 20.9 µm or less, preferably 19.7 µm or less (2.8 denier or less, preferably 2.5 denier or less), and a specific areal weight in the range from 12 to 40 g/m², preferably from 15 to 30 g/m².

The polypropylene resin composition used as the raw material according to the present invention can be spun efficiently into fibers at higher velocities continuously without suffering from filament fracture even for long-filament fibers of lower fineness having average filament diameters of, for example, 18.9 µm or less, since the resin composition contains, at a definite proportion, the lubricant component comprising a vinylidene fluoride/hexafluoropropylene copolymer and one or more inorganic compounds. Even when a web is produced under high-speed pneumatic drafting of such finer long-filament, there occurs no filament fracture. When, in contrast thereto, lubricant other than that defined according to the present invention is compounded, it is difficult to obtain fibers of long-filaments of thin filament diameters of, for example, 20 µm or so, efficiently in a continuous manner by high-speed spinning, since thereby filament fracture occurs and such filament fracture may often appear on a web production by a high-speed pneumatic drafting of such long-filament.

For spunbonded non-woven fabric, the finer the filament diameter of the constituent fiber is, the more the flexibility and touch and, thus, the hand feel will be improved. Therefore, a spunbonded non-woven fabric exhibiting very excellent hand feel can be obtained according to the present invention, by employing fibers having filament finenesses near the lower limit of the above-defined range of the average filament diameter.

While the spunbonded non-woven fabric according to the present invention can be produced by known techniques, such as spun-bond process, needle-punching process and water-punching process, it is favorable to produce it by a spun-bond process. Thus, it can be produced by a spun-bond process in such a manner, that the polypropylene resin composition to be used as the raw material is melted, the resulting molten resin is extruded continuously from a spinning nozzle to spin it into a long-filament and the resulting long-filament is then drawn out by a pneumatic high-speed drafting, in which the long-filament is drawn out on a sustaining high-speed drafting gas stream, in order to form a non-woven web directly therefrom, whereupon the resulting web is passed through an interstice between an embossing roller provided thereon with a voluntary statuary pattern and a mirror face roller under a heated condition to effect thermal press-bonding. In such a production process, the long-filament can be processed efficiently even under a high-speed spining of, for example, 2,300 meters per minute or so, without suffering from filament fracture, wherein the efficient spinning is facilitated by being drawn out by the pneumatic high-speed drafting at a velocity of, for example, 3,900 meters per minutes or so.

The spunbonded non-woven fabric according to the present invention produced in the manner as above exhibits a better appearance without revealing rough surface even when a polypropylene resin having a narrow molecular weight distribution obtained by polymerization using a single-site catalyst is employed as the raw material. It reveals scarce adherent touch and is superior in the hand feel due to permission of attaining more finer filament.

In the spunbonded non-woven fabric according to the present invention, emission of smoke from and around the spinning nozzle on spinning the raw material, i.e. polypropylene resin composition, into filament is suppressed, so that there is no fear of causing any discoloration due to adhesion of cooled and agglomerated smoke ingredients onto the filament or onto the sheet.

In contrast, a polypropylene resin composition, in which only calcium stearate most widely used as lubricant is incorporated, may be apt to suffer from occurrence of smoke emission due to condensation of vaporized calcium stearate at a portion exiting from the spinning nozzle, whereby the resulting cooled and agglomerated smoke components may adhere onto the filament to cause easily discoloration of the non-woven fabric.

The non-woven fabric laminate according to the present invention is one in which one or more spunbonded non-woven fabrics such as given above are put together with one or more melt-blown non-woven fabrics under lamination.

As the raw material of the melt-blown non-woven fabric, known thermoplastic resins may be used without any restriction, for example, polyolefin resins, such as polyethylene resins, polypropylene resins and polybutene resins; polyester resins; polyamide resins (nylons); and polystyrene resin. Among them, preference is given to polypropylene resins which are easily available and reveal better spinning performance. The polypropylene resin to be incorporated as a raw material of the melt-blown non-woven fabric may be either identical with or different from that of the spunbonded non-woven fabric.

While the polyolefin resins, such as polyethylene resins and polypropylene resins, to be incorporated as a raw material of the melt-blown non-woven fabric may be those which are produced by polymerization processes using Ziegler catalysts and solid titanium catalysts, those which are produced by polymerization processes using the above-mentioned single-site catalyst are more superior in the spinning performance and, thus, are prospective for reducing the production costs and, in addition, permit attainment of finer filament and, thus, lower stiffness of the resulting spunbonded non-woven fabric.

In the thermoplastic resin used as the raw material for the melt-blown non-woven fabric, there may be contained the lubricant component to be compounded in the raw material for the spunbonded non-woven fabric, extraneous lubricant component, stabilizer to heat, stabilizer to weathering, antioxidant, antistatic agent, antiblocking agent, dyestuffs, pigments, natural oils, synthetic oils and so on.

The melt-blown non-woven fabric constituting the non-woven fabric laminate according to the present invention is a non-woven fiber sheet (web) formed by spreading extremely fine fibers produced from the above-mentioned thermoplastic resin as the raw material in at random directions without any orientation, wherein the extremely fine fibers are held bonded by fusion or by using an adhesive or held entangled by a mechanical means. The melt-blown non-woven fabric may not be limited to that made of only one single layer but covers that made of a plural layers of two or more. A melt-blown non-woven fabric may be made of plural layers each made from raw material different from each other.

The melt-blown non-woven fabric may favorably have an average filament diameter of 7 $\mu$m or less, preferably 3 $\mu$m or less, and the melt-blown non-woven fabric in a laminate may favorably have a specific areal weight in the range from 1 to 20 g/m$^2$, preferably from 2 to 10 g/m$^2$.

For producing the melt-blown non-woven fabric, known processes can be applied as such. For example, it can be produced by melting a polypropylene resin having a melt flow rate of 800–1,000 g/10 min. at a temperature of 300° C. and the resulting melt is spun by blowing it out with a spinning air of 300° C.

For the lamination structure of the non-woven fabric laminate according to the present invention, there may be recited, for example, double layer structure of spunbonded non-woven fabric/melt-blown non-woven fabric, triple layer structure of spunbonded non-woven fabric/melt-blown non-woven fabric/spunbonded non-woven fabric and so on.

By laminating the melt-blown non-woven fabric with the spunbonded non-woven fabric, a non-woven textile exhibiting higher waterproof performance relative to its specific areal weight can be obtained, since a denser layer is present. In particular, a laminate having a triple layer structure of spunbonded non-woven fabric/melt-blown non-woven fabric/spunbonded non-woven fabric has, for a given specific areal weight, a higher waterproof performance, as compared with a single layer non-woven fabric, and the laminate reveals a higher abrasion resistance, since the fibers of the melt-blown non-woven fabric, which have lower filament strength, are not exposed to outside.

The non-woven fabric laminate according to the present invention may favorably have a specific areal weight for the laminate entirety in the range from 10 to 40 g/m$^2$, preferably from 10 to 30 g/m$^2$.

The non-woven fabric laminate according to the present invention can be produced not only in an in-line process but also in an off-line technique of putting the fabrics together. In a concrete practice, the lamiante of the triple layer structure mentioned above can be produced in an in-line process by heaping on a screen belt the fibers in the sequence of spunbonded non-woven fabric/melt-blown non-woven fabric/spunbonded non-woven fabric to build up triple layers and subjecting the resulting three-layered fabric to a heat fusion treatment on a heat embossing roll. Alternatively, it can also be produced in an off-line practice by putting prelimenarily prepared spunbonded non-woven fabrics and melt-blown non-woven fabric together and subjecting the resulting laminate to a heat fusion treatment on a heat embossing roll.

The spunbonded non-woven fabric and the laminate according to the present invention can serve for medical goods, such as medical gown and medical drapes; hygienic goods, such as top sheet for diaper, three-dimensional gathers of diaper, backing sheet of diaper, three-dimensional gathers of sanitary napkin, backing liner sheet for panties, menstrual articles and throwaway underwear; packaging material, such as wrapping cloth, laundry packaging bag and kitchen wrap; kitchen utilities, such as table cloth, table napkin, wiper and trash bag; industrial mateials, such as packaging materials and oil-absorber; agricultural materials; electric cable coverage; filter medium; and cosmetic powder container, wherein they are used especially favorably for the three-dimensional gathers of diaper, backing sheet of diaper, three-dimensional gathers of hygienic napkin, backing liner sheet for panties, throwaway underwear, laundry packaging bag, kitchen wrap and cosmetic powder container.

As described above, the spunbonded non-woven fabric according to the present invention reveals a better appearance with scarce occurrence of surface roughness and is superior in the hand feel with scarcely adherent touch, since the filament fineness, average friction factor (MIU), thickness uniformity, waterproof performance and gas permeability thereof are each in definite range.

The spunbonded non-woven fabric according to the present invention reveals a better appearance with exclusion of occurrence of rough surfaces and with scarcely adherent touch, since it has a content of a polypropylene resin having a molecular weight distribution and a melt flow rate each in a definite range and a content of a lubricant comprising a vinylidene fluoride/hexafluoropropylene copolymer and one or more inorganic compounds in a definite proportion. It further exhibits scarcely adherent touch and is, due to permission of attaining more finer filament, superior in the hand feel. The polypropylene resin composition to be used as the raw material can be spun continuously into a filament efficiently even in the case of spinning long-filaments without suffering from filament fracture. The spunbonded non-woven fabric according to the present invention can be produced at a high productivity, since the long-filaments are not subject to filament fracture also upon drafting thereof in the production of a web. It is necessary to reduce the extrusion rate, in particular, for spinning finer filaments of 2 denier or less, nevertheless, such reduction of extrusion rate can be suppressed according to the present invention in which the filament fineness can efficiently be reduced and, thus, a dominance is admitted in the productivity of the spunbonded non-woven fabric of fibers, especially, of 2 denier or less.

The non-woven fabric laminate according to the present invention reveals a waterproof performance which is further more higher as compared with laminates having no content of lubricant, since it is prepared by laminating the spunbonded non-woven fabric and the melt-blown non-woven fabric.

Now, the present invention is decribed by way of Examples. In the following Examples and Comparative Examples, melt flaw rate (MFR) and the molecular weight distribution (Mw/Mn) were determined by the methods given below.

○ MFR: determined according to ASTM D 1238 at 230° C. under a load of 2.16 kg.

○ Mw/Mn: determined using GPC-150C of the firm Water in the manner as follows:

A separation column TSK GNH TH (of Tosoh K.K. with a column size of a diameter of 7.8 mm and a length of 600 mm) was used at a column temperature of 140° C. with a mobile phase of o-dichlorobenzene (a product of Wako Pure Chemical Industries, Ltd.) with 0.025% by weight of BHT (a product of Takeda Chemnical Industries, Ltd.) as antioxidant. The mobile phase with a sample concentration of 0.1% by weight was moved at a rate of 1.0 ml per minute, with an injected amount of the sample of 500 µl. A differential refractometer was used as the detector. Standard polystyrenes used were suppied from Tosoh K.K.

EXAMPLE 1 AND COMPARATIVE EXAMPLE 1

A homopolymeric popypropylene resin produced using a metallocene catalyst and having a melt flow rate of 1.5 g/10 min., a melting point of 153° C., a crystallization temperature of 114° C. and an Mw/Mn value of 2.5 was blended with a lubricant (a product of the firm 3M with trademark DYNAMAR FX-9613) containing 90% by weight of vinylidene fluoride/hexafluoropropylene copolymer, 6% by weight of talc, 2% by weight of calcium carbonate and 2% by weight of silicon oxide, in such a proportion that the blend would have had a lubricant content of 0.022% by weight (0.02% by weight as calculated for the content of vinylidene fluoride/hexafluoropropylene copoymer), to prepare a polypropylene resin composition.

This polypropylene resin composition was spun into a filament by extruding it at 250° C. using an extruder, while passing the extruded molten filament through a water bath continuously to cool it before it is wound up. The resulting filament revealed no occurrence of rough surface and exhibited pretty appearance without showing accompaniment of the cooling water onto the filament due to surface roughness (Example 1).

On the other hand, a filament obtained in the same way as in Example 1 except that the lubricant was not incorporated revealed rough surfaces due to occurrence of melt fracture and was not able to be wound up due to accompaniment of the filament with the cooling water on the irregular surface of the filament (Comparative Example 1).

EXAMPLE 2 AND COMPARATIVE EXAMPLE 2

The procedures of Example 1 were pursued except that a homopolymeric polypropylene resin produced using a metallocene catalyst and having a melt flow rate of 6.3 g/10 min., a melting point of 153° C., a crystallization temperature of 112° C. and an Mw/Mn value of 2.4 was employed. It resulted in that the filament made from the composition having the lubricant revealed no occurrence of rough surface and exhibited pretty appearance without showing accompaniment of the cooling water onto the filament due to surface roughness (Example 2).

On the other hand, a filament obtained in the same way as in Example 2 except that the lubricant was not incorporated revealed rough surfaces and was not able to be wound up due to accompaniment of the filament with the cooling water on the irregular surface of the filament (Comparative Example 2).

EXAMPLE 3

A homopolymeric polypropylene resin produced using a metallocene catalyst and having a melt flow rate of 65 g/10 min., a melting point of 150° C. and an Mw/Mn value of 2.5 was blended with DYNAMAR FX-9613 mentioned above in such a way that the content of the vinylidene fluoride/hexafluoropropylene copolymer would have been 0.02% by weight, whereupon the resulting blend was kneaded on a Henschel mixer and was then pelletized.

The pelletized resin composition was supplied to a spunbonded non-woven fabric production apparatus, in which it was spun into filament which was then subjected to pneumatic drafting by an air jet before being heaped over a screen belt. The resulting heaped layer of the filament was passed through heat embossing rolls to obtain a spunbonded non-woven fabric. No emission of smoke was recognized upon the spinning and any discoloration of the non-woven fabric was not observed.

COMPARATIVE EXAMPLE 3

The procedures of Example 3 were pursued except that, instead of DYNAMAR FX-9613, calcium stearate was incorporated in such an amount that the content thereof would have reached to 0.1% by weight. An emission of smoke in the vicinity of the spinning nozzle was observed upon the spinning during the production of the non-woven fabric and adhesion of agglomerated smoke components on the filament and on the non-woven fabric occured, whereby no better non-woven fabric was obtained.

EXAMPLES 4 TO 6

A homopolymeric polypropylene resin produced using a metallocene catalyst and having a melt flow rate of 30 g/10 min., a melting point of 149° C., a crystallization temperature of 108° C. and an Mw/Mn value of 2.8 was blended with DYNAMAR FX-9613 mentioned above in such a way that the content of the vinylidene fluoride/hexafluoropropylene copolymer would have amounted to that given in Table 1, whereupon the resulting blend was kneaded on a Henschel mixer and was then pelletized.

The pelletized resin composition was supplied to a spunbonded non-woven fabric production apparatus, in which it was spun, via a spinneret provided with 1,000 extrusion holes each having a diameter of 0.6 mm, at an extrusion rate for each hole of 0.7 g/min., into filaments which were then subjected to pneumatic drafting by an air jet at a speed of 3,900–4,600 m/min. before being heaped over a screen belt. The resulting heaped layer of the filament was passed through heat embossing rolls to obtain a spunbonded non-woven fabric. Results are recited in Table 1.

COMPARATIVE EXAMPLE 4

A spunbonded non-woven fabric was obtained by the same procedures as in Example 4 except that the polypropylene resin was used alone without compounding DYNAMAR FX-9613 and that the pneumatic drafting speed by the air jet was changed to 3,900 m/min. Results are recited in Table 1.

COMPARATIVE EXAMPLE 5

It was attemped to produce a spunbonded non-woven fabric by the same procedures as in Example 4 except that the polypropylene resin was used alone without compounding DYNAMAR FX-9613 and that the pneumatic drafting speed by the air jet was changed to 4,600 m/min. However, no spunbonded non-woven fabric was able to obtain due to occurrence of filament fracture upon filament spinning.

EXAMPLES 7 AND 8

A non-woven fabric laminate having a three-layered structure of spunbonded non-woven fabric/melt-blown non-woven fabric/spunbonded non-woven fabric (in the following, sometimes abbreviated to S/M/S) was produced.

For the raw materials of the spunbonded non-woven fabric, the homopolymeric polypropylene resin used in Example 4 was used under blending with the said DYNAMAR FX-9613 so that the content of the vinylidene fluoride/hexafluoropropylene was settled at 0.04% by weight or at 0.08% by weight.

As the raw material of the melt-blown non-woven fabric, a homopolymeric polypropylene produced using a solid titanium catalyst and having a melt flow rate of 1,000 g/10 min. and a melting point of 161° C. was used alone and no lubricant was used.

The non-woven laminate having the three-layered structure was produced in the manner as follows. On a screen belt, a spunbonded non-woven fabric, a melt-blown non-woven fabric and a spunbonded non-woven fabric were laminated in this order to form three layers by filament heaping technique, whereupon the formed three-layered heap was passed through heat embossing rolls to cause thermal fusion. The embossing surface area was settled to be 18%. Results are recited in Table 2.

TABLE 1

|  | Example | | | Compar. |
|---|---|---|---|---|
|  | 4 | 5 | 6 | Ex. 4 |
| Sort of polypropylene | Homopolym. | Homopolym. | Homopolym. | Homopolym. |
| MFR (g/10 min.) | 30 | 30 | 30 | 30 |
| Mw/Mn | 2.8 | 2.8 | 2.8 | 2.8 |
| Proportion of lubricant (wt. %) | 0.02 | 0.04 | 0.08 | 0 |
| Drafting air speed (m/min.) | 3900 | 4200 | 4600 | 3900 |
| Specific areal weight (g/m$^2$) | 20 | 20 | 20 | 20 |
| MIU *1) | 0.29 | <0.27 | 0.25 | 0.32 |
| Thickness uniformity *2) | 0.73 | <0.71 | 0.69 | 0.87 |
| Waterproof perform. (mm H$_2$O) *3) | 63 | over 65 | 73 | 59 |
| Gas permeability (ml/cm$^2$/sec) *4) | 460 | 430 | 424 | 483 |
| Filament fineness (denier) *5) | 2.7 | <2.5 | 2.3 | 2.9 |
| Hand feel *6) | Δ | ○ | ○ | x~Δ |

*1): MIU = average friction factor, determined according to KATO TECH-method using KES-SE Frictional Feel Tester of the firm KATO TECH. The lower this value is, the lesser the adherent touch will be.
*2): The thickness uniformity is determined in such a way that the specific areal weight [A (g/m$^2$)] of a test piece of 0.15 m$^2$ (1 m × 0.15 m) is first determined and, then, five thicker portions and twenty thinner portions are chosen visually on the test piece and are punched out using a punching tool of 13 mmφ, whereupon the specific areal weights for these punched-out segments are determined [B (g/m$^2$) for the thicker portions and C (g/m$^2$) for the thinner portions], from which the thickness uniformity is calculated by the equation:
Thickness uniformity = (B − C)/A
*3): The waterproof performance is determined according to JIS L 1092.
*4): The gas permeability is determined according to JIS L 1096.
*5): The filament fineness is determined by three-point measurements on each filament by magnified observation under an optical microscope.
*6): Hand feel is determined by organoleptical judgements by 10 randomly selected panelists by comparing their feels of softness on hand touch to the sample piece and to the comparative test piece. For the comparative test piece, a spunbond non-woven fabric (a specific areal weight of 20 g/m$^2$, a fineness of 2.8 denier) made of a polypropylene resin with no lubricant is used.
Assessment is based on the following criterion:
○: At least seven panelists judge as "soft".
Δ: At least five but less than seven panelists judge as "soft".
x: Less than five panelists judge as "soft".

COMPARATIVE EXAMPLE 6

A spunbonded non-woven fabric was obtained in the same manner as in Example 7 except that DYNAMAR FX-9613 was not incorporated in the raw material for the spunbonded non-woven fabric. Results are recited in Table 2.

TABLE 2

|  | Example | | Compar. |
|---|---|---|---|
|  | 7 | 8 | Ex. 6 |
| Spunbond non-woven fabric | | | |
| Sort of polypropylene | Homo-polym. | Homo-polym. | Homo-polym. |
| MFR (g/10 min.) | 30 | 30 | 30 |
| Mw/Mn | 2.8 | 2.8 | 2.8 |
| Proportion of lubricant (wt. %) | 0.04 | 0.08 | 0 |
| Melt-blown non-woven fabric | | | |
| Sort of polypropylene | Homo-polym. | Homo-polym. | Homo-polym. |
| MFR (g/10 min.) | 1,000 | 1,000 | 1,000 |
| Mw/Mn | — | — | — |
| Proportion of lubricant (wt. %) | 0 | 0 | 0 |
| Structure of laminate *7) | S/M/S | S/M/S | S/M/S |
| Specific areal weight (g/m$^2$) *8) | 7/3/7 | 7/3/7 | 7/3/7 |
| MIU *1) | 0.25 | 0.23 | 0.32 |
| Thickness uniformity *2) | 0.51 | 0.50 | 0.52 |
| Waterproof perform. (mm H$_2$O) *3) | 110 | 115 | 100 |
| Gas permeability (ml/cm$^2$/sec) *4) | 290 | 270 | 310 |
| Filament fineness (S/M/S) *9) | 2.7/3/2.7 | 2.5/3/2.5 | 2.9/3/2.9 |
| Hand feel *6) | ○ | ○ | Δ |

Notes:
*1) to *4) and *6): See Table 1.
*7): The structure of laminate represented by S/M/S indicates three-layered structure of spunbond non-woven fabric/melt-blown non-woven fabric/spunbonded non-woven fabric.
*8): Specific areal weight of each layer of S/M/S.
*9): Represented by denier/μm/denier for the filament fineness for each of the spunbonded non-woven fabric/melt-blown non-woven fabric/spunbonded non-woven fabric. The filament diameter for the melt-blown non-woven fabric is determined in the same way as that for the spunbonded non-woven fabric.

INDUSTRIAL APPLICABILITY

The spunbonded non-woven fabric and the laminate according present invention can favorably be applied for, in particular, three-dimensional gathers of diaper, backing sheet of diaper, three-dimensional gathers of hygienic napkin, backing liner sheet of panties, throwaway under wear, laundry packaging bag, kitchen wraps, cosmetic powder container and so on.

What is claimed is:

1. A spunbonded non-woven fabric made of fibers which comprise a polypropylene resin composition comprising 99.995–99.7% by weight of a polypropylene resin and 0.005–0.3% by weight of a lubricant, said lubricant comprising 70 to 100% by weight of a vinylidene fluoride/hexafluoropropylene copolymer and 0 to 30% by weight of one or more inorganic compounds, the said fibers having fiber finesses in the range from 0.8 to 2.8 denier, wherein the said fabric has an average friction factor (MIU) of 0.1 to 0.3, a thickness uniformity of not higher than 0.8, a waterproof performance of at least 60 mm H$_2$O and a gas permeability of not higher than 480 ml/cm$^2$/sec.

2. The spunbonded non-woven fabric as claimed in claim 1, wherein the polypropylene resin is that produced by a polymerization process using a single-site catalyst.

3. A non-woven fabric laminate comprising one or more webs of the spunbonded non-woven fabric as claimed in claim 2 and one or more webs of one or more melt-blown non-woven fabrics.

4. The non-woven fabric laminate as claimed in claim 3, wherein it has a three-layered structure of spunbonded non-woven fabric/melt-blown non-woven fabric/spunbonded non-woven fabric.

5. A non-woven fabric laminate comprising one or more webs of the spunbonded non-woven fabric as claimed in claim 4 and one or more webs of one or more melt-blown non-woven fabrics.

6. The non-woven fabric laminate as claimed in claim 5, wherein it has a three-layered structure of spunbonded non-woven fabric/melt-blown non-woven fabric/spunbonded non-woven fabric.

7. A spunbonded non-woven fabric made of fibers obtained by spinning a polypropylene resin composition comprising
99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and
0.005–0.3% by weight of a lubricant comprising 70 to 100% by weight of a vinylidene fluoride/hexafluoropropylene copolymer and 0 to 30% by weight of one or more inorganic compounds.

8. The spunbonded non-woven fabric as claimed in claim 7, wherein the polypropylene resin is that produced by a polymerization process using a single-site catalyst.

9. A non-woven fabric laminate comprising one or more webs of the spunbonded non-woven fabric as claimed in claim 8 and one or more webs of one or more melt-blown non-woven fabrics.

10. The non-woven fabric laminate as claimed in claim 9, wherein it has a three-layered structure of spunbonded non-woven fabric/melt-blown non-woven fabric/spunbonded non-woven fabric.

11. A non-woven fabric laminate comprising one or more webs of the spunbonded non-woven fabric as claimed in claim 7 and one or more webs of one or more melt-blown non-woven fabrics.

12. The non-woven fabric laminate as claimed in claim 11, wherein it has a three-layered structure of spunbonded non-woven fabric/melt-blown non-woven fabric/spunbonded non-woven fabric.

13. A spunbonded non-woven fabric made of fibers obtained by spinning a polypropylene resin composition comprising
99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and
0.005–0.3% by weight of a lubricant comprising 70 to 100% by weight of a vinylidene fluoride/hexafluoropropylene copolymer and 0 to 30% by weight of one or more inorganic compounds, the said inorganic compounds being selected from the group consisting of talc, calcium carbonate, silicon oxide and barium sulfate.

14. A non-woven fabric laminate comprising one or more webs of the spunbonded non-woven fabric as claimed in claim 13 and one or more webs of one or more melt-blown non-woven fabrics.

15. The non-woven fabric laminate as claimed in claim 14, wherein it has a three-layered structure of spunbonded non-woven fabric/melt-blown non-woven fabric/spunbonded non-woven fabric.

16. A spunbonded non-woven fabric made of fibers obtained by spinning a polypropylene resin composition comprising 99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and 0.005–0.3% by weight of a lubricant comprising 70 to 100% by weight of a vinylidene fluoride/hexafluoropropylene copolymer and 0 to 20% by weight of talc, 0 to 10% by weight of calcium carbonate and 0 to 10% by weight of silicon oxide.

17. A non-woven fabric laminate comprising one or more webs of the spunbonded non-woven fabric as claimed in claim 16 and one or more webs of one or more melt-blown non-woven fabrics.

18. The non-woven fabric laminate as claimed in claim 17, wherein it has a three-layered structure of spunbonded non-woven fabric/melt-blown non-woven fabric/spunbonded non-woven fabric.

19. A spunbonded non-woven fabric made of fibers obtained by spinning a polypropylene resin composition comprising 99.995–99.7% by weight of a polypropylene resin having a molecular weight distribution (Mw/Mn) of 1 to 3.5, determined by a gel permeation chromatography (GPC), and a melt flow rate of 0.01 to 300 g/10 min., determined according to ASTM D 1238 at 230° C. under a load of 2.16 kg, and 0.005–0.3% by weight of a lubricant comprising 89 to 91% by weight of a vinylidene fluoride/hexafluoropropylene copolymer, 5 to 7% by weight of talc, 1.5 to 2.5% by weight of calcium carbonate and 1.5 to 2.5% by weight of silicon oxide.

20. A non-woven fabric laminate comprising one or more webs of the spunbonded non-woven fabric as claimed in claim 19 and one or more webs of one or more melt-blown non-woven fabrics.

21. The non-woven fabric laminate as claimed in claim 20, wherein it has a three-layered structure of spunbonded non-woven fabric/melt-blown non-woven fabric/spunbonded non-woven fabric.

\* \* \* \* \*